US012665379B2

(12) United States Patent
Pape et al.

(10) Patent No.: US 12,665,379 B2
(45) Date of Patent: Jun. 23, 2026

(54) METHOD AND SYSTEM FOR GENERATION OF OPTICAL PULSES OF LIGHT

(71) Applicant: VALO Innovations GmbH, Hannover (DE)

(72) Inventors: Alexander Pape, Hannover (DE); Oliver Prochnow, Hannover (DE)

(73) Assignee: VALO Innovations GmbH, Hannover (DE)

( * ) Notice: Subject to any disclaimer, the term of this patent is extended or adjusted under 35 U.S.C. 154(b) by 969 days.

(21) Appl. No.: 17/794,163

(22) PCT Filed: Feb. 1, 2021

(86) PCT No.: PCT/EP2021/052311
§ 371 (c)(1),
(2) Date: Jul. 20, 2022

(87) PCT Pub. No.: WO2021/152174
PCT Pub. Date: Aug. 5, 2021

(65) Prior Publication Data
US 2023/0094403 A1    Mar. 30, 2023

(30) Foreign Application Priority Data
Jan. 30, 2020    (LU) ....................................... 101629

(51) Int. Cl.
*H01S 3/1115*    (2023.01)
*H01S 3/067*    (2006.01)
*H01S 3/16*    (2006.01)

(52) U.S. Cl.
CPC ........ *H01S 3/1115* (2013.01); *H01S 3/06725* (2013.01); *H01S 3/1608* (2013.01);
(Continued)

(58) Field of Classification Search
CPC .. H01S 3/1115; H01S 3/06725; H01S 3/0057; H01S 2301/08; H01S 5/0057
See application file for complete search history.

(56) References Cited

U.S. PATENT DOCUMENTS

| | | | |
|---|---|---|---|
| 5,513,194 A | 4/1996 | Tamura et al. | |
| 9,362,702 B2 | 6/2016 | Delaigue | |
| 2003/0156605 A1* | 8/2003 | Richardson | ......... H01S 3/06791 372/25 |

OTHER PUBLICATIONS

D. Strickland, G. Mourou, "Compression of amplified chirped optical pulses" Opt. Commun. 56, 219, 1985.
(Continued)

*Primary Examiner* — Eric L Bolda
(74) *Attorney, Agent, or Firm* — 24IP Law Group USA, PLLC; Timothy R DeWitt

(57) ABSTRACT
A laser system for the generation of ultrashort optical pulses of light including an oscillator emitting low power and negatively chirped optical pulses with a spectral bandwidth W1, a dispersive connecting segment to maintain the sign of the chirp of the pulses of the oscillator, an optical amplifier for amplifying the optical light pulses and a negative group velocity dispersion segment for compensating phase contributions of the whole propagation process. During the propagation from the output of the oscillator to the end of the optical amplifier, the chirp of the light pulses will change once from negative to positive chirp. After a final compression stage ultrashort optical pulses can be generated.

20 Claims, 7 Drawing Sheets

(52) U.S. Cl.
CPC .......... *H01S 3/1611* (2013.01); *H01S 3/1616* (2013.01); *H01S 3/1618* (2013.01); *H01S 2301/08* (2013.01)

(56) References Cited

OTHER PUBLICATIONS

Kaumanns, et al., "Multipass spectral broadening of 18 mJ pulses compressible from 1.3 ps to 41 fs", Optics Lett.,43, pp. 5877-5880 (2018).

K. F. Mak, et al., Compressing µJ-level pulses from 250 fs to sub-10 fs at 38-MHz repetition rate using two gas-filled hollow-core photonic crystal fiber stages, Opt. Lett. 40, pp. 1238-1241 (2015).

Wang Sij a et al: "Intensity noise reduction of a high-power nonlinear femtosecond fiber amplifier based on spectral-breathing self-similar parabolic pulse evolution", Proceedings of SPIE, vol. 9893, Apr. 17, 2016, pp. 98930J-98930J, DOI: 10.1117/12.2227743.

Song Huanyu et al "Femtosecond Laser Pulse Generation from Picosecond Laser Source with Self-Similar Amplification", 2018 Conference on Lasers and Electro-Optics (CLEO), OSA, May 13, 2018, pp. 1-2.

Wang Sija et al "On the efficiency of self-similar pulse evolution in fiber amplifiers with gain shaping", 2015 I I th Conference on Lasers and Electro-Optics Pacific Rim, (CLEO-PR), IEEE, vol. 4, Aug. 24, 2015, pp. 1-2, XP032841059, DOI: 10. I 109/CLEOPR.2015. 7376296.

Sijia Wang et al., "Self-similar evolution in a short fiber amplifier through nonlinear pulse preshaping," Optics Letters / vol. 38, No. 3 / Feb. 1, 2013, pp. 296-298.

Katherine J. Bock, "Femtosecond Fiber Lasers," Thesis, The Ottawa-Carleton Institute for Biomedical Engineering (2012).

Wikipedia , "Chirped pulse amplification ".

E. B. Treacy, "Optical Pulse Compression With Diffraction Gratings," IEEE Journal of Quantum Electronics, vol. QE-5, No. 9, Sep. 1969.

* cited by examiner

METHOD AND SYSTEM FOR GENERATION OF OPTICAL PULSES OF LIGHT

CROSS-REFERENCE TO RELATED APPLICATION

This application claims the benefit of and priority to Luxembourg Patent Application No. LU101629, filed on 30 Jan. 2020. The entire disclosure of Luxembourg Patent Application No. LU101629 is hereby incorporated by reference.

FIELD OF THE INVENTION

The invention relates to a method and system for generating optical pulses of light with a spectral bandwidth much larger than the normal gain bandwidth of a typical rare earth doped laser medium or laser active crystal. Shorter optical pulses can be generated compared to a conventional laser system by compressing these generated ultrabroadband optical pulses.

BACKGROUND TO THE INVENTION

Today ultrashort optical pulses of laser light with pulse durations less than a picosecond are widely used for many applications. Examples include the use in processing of micromaterials and nanomaterials, medical applications, like ophthalmology or nanosurgery, as well as in scientific applications or biomedical applications, like multiphoton microscopy. One of the well-known limitations of using these optical pulses is the so-called heat affected zone (HAZ). The heat affected zone is due to a thermal heating of the environment about a sample or a heating of living cells in biomedical applications. This can lead to thermal damage of the sample or the living cells.

The heat affected zone or thermal damage in general can be reduced by reducing the illumination time of the sample by the optical pulse. If the duration of the optical pulse (i.e., illumination time) is shorter than a relaxation time of heat to the surrounding environment, then more precise results can be obtained. This can significantly improve the accuracy of the material processing or the excitation of individual cells, for example.

There is therefore clearly a need for shorter optical pulses. It is known that ultrashort optical pulses comprise very broad optical spectra due to the product of time and bandwidth. This means that the ultrashort optical pulses are constructed from a plurality of optical frequencies (wavelengths) which are coupled by a mode locking mechanism. In general, the generation of ultrashort optical light pulses is based on an interaction of optical pulses with linear effects (affecting only the temporal profile of a pulse) and nonlinear effects (affecting only the spectral profile of a pulse) in materials. The linear effects are due to material dispersion effects. For example, the group velocity dispersion (GVD; ($\beta_2$ in ps$^2$/(nm*m)) affects the optical frequencies of the optical pulse travelling through the material and thus influences the temporal profile of the optical pulse. The GVD is mathematically the derivation of the inverse group velocity with respect to the angular frequency. Normal dispersion or positive group velocity dispersion ($\beta_2 > 0$) in the material causes the optical pulses to diverge in time. In this case, red spectral components of the optical pulse move faster than blue spectral components of the optical pulse and lead to a temporal stretched optical pulse. If anomalous or negative group velocity dispersion ($\beta_2 < 0$) is present, then the red spectral components move slower than the blue spectral components leading also to a temporal stretched optical pulse.

On a temporal axis, the term "chirp" describes which ones of the spectral components propagates at the front of the optical pulse. A positive chirp in this case means that the red spectral components propagate in front (faster) of the blue spectral components. Similarly, a negative chirp describes that the blue spectral components propagate in front of the red spectral components. If the chirp is zero, then all of the spectral components arrive at the same time. The shortest possible time duration is present if all spectral components of the optical pulse propagate with the same velocity. This shortest possible pulse duration represents the so called "Fourier Limit" of the optical pulses.

A positive chirp results in an increase in normal (positive) dispersion and leads to a longer stretched optical pulse (time domain). On the other hand, a positive chirp will be reduced due to an anomalous (negative) dispersion which leads to a shortened optical pulse.

This effect means that the amount of the negative chirp of the optical pulse will be reduced in a normal dispersion segment and this reduction leads to a time shortened pulse. On the other hand, the amount of the negative chirp will increase when the optical pulse passes through a negative dispersion segment. The sign of the chirp can only change if the optical pulse reaches the Fourier Limit within the dispersion segment and continues propagating further through the dispersion segment.

The larger the spectral bandwidth of the optical pulse, the more the effects of higher order material dispersion must be taken into account. These higher order effects are mathematically a derivation of the GVD. For example, third order dispersion (TOD) will lead to an asymmetry of the temporal shape of the optical pulses.

On the other hand, nonlinear effects and therefore intensity dependance effects only affecting the spectral domain of the optical pulses. For example, self-phase modulation (SPM) is an effect due to a varying refractive index in the material due to the optical Kerr effect. The SPM leads to the generation of new spectral components if the optical pulse is positively chirped, and positive group velocity dispersion is present. Conversely, the SPM can destroy spectral components if the optical pulse is negatively chirped and positive group velocity dispersion is present.

Higher order nonlinear effects can also occur in the material depending on the peak power of the optical pulses.

The most common approach to generate intense ultrashort optical pulses is based on the "Chirped pulse amplification (CPA)" method (described by D. Strickland, G. Mourou, "Compression of amplified chirped optical pulses" Opt. Commun. 56, 219, 1985). The basic idea described in the paper is to stretch the optical pulse in time generated from an oscillator by a positive dispersive segment and subsequently amplify the optical light pulse in an optical amplifier. Typical stretching factors are>>100. Finally, the amplified optical light pulses will be recompressed in time in a negative group velocity dispersive segment. This is a so-called linear amplification, as the optical pulses are stretched in time avoiding nonlinear effects during propagation. This also means that no new spectral components can be generated by SPM. Therefore, the optical bandwidth of the optical pulses remains at the best the same after amplification. Typically, the spectral bandwidth of the optical pulse decreases due to gain narrowing effects during amplification. Thus, it is not possible to generate shorter pulse durations than would be possible with the oscillator itself.

To generate new spectral components, a nonlinear process like the afore-mentioned self-phase modulation is necessary. Therefore, a new approach must be chosen compared to the prior art CPA method.

There are different approaches to generate very short pulse durations in the range of a few femtoseconds to a few ten femtoseconds. For example, after optical amplification it is possible to use nonlinear effects for propagation through a segment with positive group velocity dispersion. This is described, for example, as the multi pass concept in Optics Lett., 43, pp. 5877-5880 (2018) or are gas filled hollow core fibers (for example Opt. Lett. 40, 1238-1241 (2015)). For this purpose, however, a very high pulse peak power must already be available in order to generate a significant spectral broadening. Furthermore, the additional phase of the broadened optical pulses must be compressed again in a further segment of negative group velocity dispersion.

Another approach is described for example in U.S. Pat. No. 9,362,702 B2 (Delague et al, assigned to Amplitude Systèmes). A segment with negative group velocity dispersion is used after an oscillator prior to amplification of the optical pulses. Typically grating compressors, prism compressors or other segments with negative group velocity dispersion are suitable for this compression. In this '702 patent, the positive chirp of the optical pulses from the oscillator will be reduced within the segment of negative group velocity dispersion. Furthermore, a negative chirp can be achieved by this method set out in US '702. This leads to a change in the sign of the chirp during the propagation within the segment of negative group velocity dispersion. By amplifying and due to nonlinear effects within the positive group velocity dispersion amplifier, the negative chirped optical pulses from the segment of negative group velocity dispersion will change the chirp sign again to a positive value. This two times change of the chirp sign makes it necessary to time-compress the amplified optical light pulses after amplification with a further negative group velocity dispersion segment.

In another U.S. Pat. No. 5,513,194 A (Tamura et al, assigned to MIT), negatively chirped optical pulses from a so-called Stretched Pulse Oscillator are disclosed. Due to the evolution of the optical light pulse inside a "stretched pulse laser" the chirp changes its sign twice during one roundtrip.

Wang Sija et al: "Intensity noise reduction of a high-power nonlinear femtosecond fiber amplifier based on spectral-breathing self-similar parabolic pulse evolution", Proceedings of SPIE, Vol. 9893, 17 Apr. 2016, pages 98930J-98930J, DOI: 10.1117/12.2227743 discloses a laser system comprising an Yb-doped fiber oscillator producing a plurality of positively chirped optical pulses having a first spectral width. A large mode area (LMA) photonic crystal fiber (PCF) amplifier receives the plurality of optical pulses and amplifies the optical pulse of light to produce an optical light pulse having a second spectral width, wherein the second spectral width being greater than the first spectral width. A connecting segment comprising a diffraction grating-pair pre-chirper is connected directly between the oscillator and the amplifier. To generate the broadband optical pulses the sign of the chirp has to change twice within the propagation.

Song Huanyu et al "Femtosecond Laser Pulse Generation from Picosecond Laser Source with Self-Similar Amplification", 2018 Conference on Lasers and Electro-Optics (CLEO), OSA, 13 May 2018, pages 1-2, also discloses a laser system with an oscillator producing a plurality of positively chirped optical pulses. An amplifier receives the plurality of optical pulses and amplifies the optical pulse of light to produce an optical light pulse having a second spectral width, the second spectral width being greater than the first spectral width. A prechirper is connected directly between the oscillator and the amplifier, wherein the prechirper has a negative group velocity dispersion to reduce the positive chirp of the oscillator.

The Song Huanyu publication teaches a picosecond fiber laser used with a fiber Bragg grating (FBG). The FBG is a narrow band filter in a positive dispersion laser ($\beta2$ is positive for optical fibers below 1.3 μm wavelength). There is no negative dispersion segment includes in the taught laser system and so the optical pulses produced by the fiber oscillator are positively chirped. The grating compressor used as the prechirper in front of the main amplifier has a negative dispersion to reduce the positive chirp of the oscillator.

Finally, Wang Sija et al "On the efficiency of self-similar pulse evolution in fiber amplifiers with gain shaping", 2015 11th Conference on Lasers and Electro-Optics Pacific Rim, (CLEO-PR), IEEE, vol. 4, 24 Aug. 2015, pages 1-2, XP032841059, DOI: 10.1109/CLEOPR.2015.7376296. This Wang Sija et al publication explains the physical mechanism behind the laser amplification process and how this mechanism depends on the initial system parameters. In this case positive chirped optical pulses of an oscillator were also used and a prechirping is done in a negative dispersion pre chirper segment in front of the amplifier leading to a change twice of the sign of the chirp within the whole setup.

SUMMARY OF THE INVENTION

This document discloses a laser system in which a stretched pulse oscillator producing a negatively chirped pulse can be connected directly to the amplifier via an optical fiber with positive group velocity dispersion leading to an alignment free setup. The laser system of this document eliminates the need for a segment with negative group velocity dispersion after the oscillator and before amplification. A negative dispersion element ($\beta2<0$) is typically used as the optical pulses are typically chirped positively when coming out of the oscillator and the optical pulses need to be compressed in a compressor to achieve so called self-similar amplification. These compressors are typically a free space and/or bulky grating, prism or GRISM compressor.

This document teaches a system which leads to a cost effective, robust, and very simple setup. In this case the sign of the chirp of the oscillator will be reduced in a normal dispersion segment and changes a single time, after reaching the Fourier Limit in the amplifier, compared to the prior art systems in which the chirp of the optical pulses changes twice.

This document describes a laser system comprises an oscillator producing a negatively chirped optical pulse having a first spectral width W1, an amplifier for receiving the optical pulse and amplifying the optical pulse of light to produce an optical light pulse having a second spectral width W2, the second spectral width being greater than the first spectral width, and a connecting segment connected directly between the oscillator and the amplifier, wherein the connecting segment has a positive dispersion and maintains the sign of the chirp of the oscillator.

In one aspect, the laser system further comprises a second segment of positive group velocity dispersion after the optical amplifier.

In another aspect, the laser system further comprises a negative group velocity dispersion segment connected to an output of the amplifier and which is adapted to compensate the phase of the optical pulse.

The laser system can be implemented as a solid-state system (i.e., integrated on a chip) or as a fiber-based system. In the latter case, the amplifier is a fiber amplifier. It is also possible to use a combination of a solid-state system and a fiber-based system.

In one aspect, the spectral width of the optical pulse decreases from an input of the connecting segment within the amplifier to a minimum in the amplifier and then increases to a larger amount at an output of the amplifier, meaning that the chirp has changed. The connecting segment in the laser system can be a waveguide and this can be implemented on a chip in a solid-state system, as a length of fiber in a fiber-based system or as a positive group velocity dispersion material.

The laser system may further comprise at least one optical isolator or a component which suppresses an optical signal propagating towards the oscillator, could be one of a free space or fiber coupled. This one optical isolator or a component can be located in the laser system after the oscillator or within the connecting segment. At least a pre-amplifier or an attenuator can also be incorporated within the connecting segment.

The laser system creates in effect a virtual nonlinear optical bandpass filter through the interaction of the chirp of the pulses, the dispersive effects and nonlinear effects occurred within the amplifier The laser system includes optionally at least one optical pulse picker to reduce the repetition rate of the optical pulses or adding a pulse on demand functionality to the laser system.

In another aspect, the negative chirp of the oscillator can be increased by using an additional negative dispersion element within the connecting segment. The additional negative dispersion element will only change the amount of chirp but not the sign of the chirp within the connecting segment. The additional negative dispersion element will shift only the position of the Fourier limited pulse within the amplifier.

By adding the negative dispersion element to the connection segment, the position of the chirp free point will shift to the end of the amplifier if the amount of normal dispersion is kept constant. During the amplification process, the SPM will reduce the spectral bandwidth in the presence of a negative chirp leading to a narrow optical bandwidth W3.

If optional elements like a fiber-based pulse picker will increase the overall positive dispersion of the connection segment the additional negative dispersion element can be used to fix the position of the chirp free point in the amplifier.

In general, the amount of the chirp will define the spectral bandwidth of the amplifier taking into account the overall dispersion of the system.

In another aspect the spectral width of the optical pulse decreases due to the interplay of linear and nonlinear effects (SPM) from an input of the connecting segment within the amplifier to a minimum after the amplifier depending on the power level.

The oscillator comprises a negative group velocity dispersion segment and a positive group velocity dispersion segment arranged in a way that the overall net dispersion of the cavity is less than 0.1 ps$^2$ ($\beta_2$<0.1 ps$^2$).

The oscillator and the amplifier comprise a laser active medium. The laser active medium is selected from, for example, but not limited to the group of rare earth dopants comprising Yb, Nd, Tm, or Er. It should be noted that the materials need not be identical in both the oscillator and the amplifier.

In one aspect of the laser system, the oscillator comprises a linear cavity with an absorber at one end and a grating compressor at the other end.

The amplifier can be pumped by at least a single mode diode laser or a multi-mode diode laser.

The fiber sections of the oscillator and the amplifier comprise, but not limited to, single clad fibers, double clad fibers or photonic crystal fibers, also including rod-type fibers.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
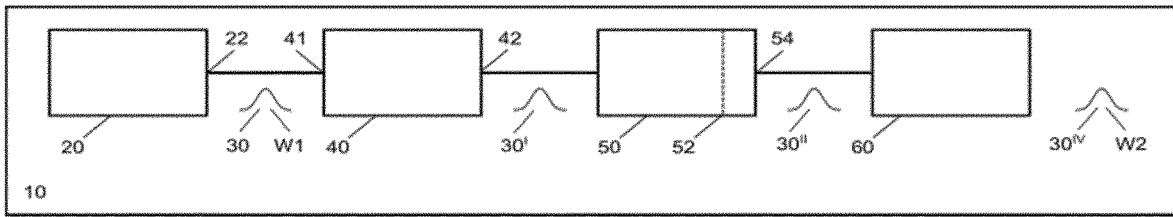
FIG. 1 shows a schematic general diagram of a first aspect of the invention

FIG. 1 shows an aspect of a laser system 10 for generating ultrabroadband optical pulses of light is based on a stretched pulse oscillator 20 emitting a plurality of negatively chirped optical pulses 30. An input 41 of a positive group velocity dispersion connecting segment 40 is connected to the output 22 of the stretched pulse oscillator 20. An optical amplifier 50 having positive group velocity dispersion is connected to an output 42 of the connecting segment 40 and amplifies the optical pulses 30' and is followed by a negative group velocity dispersion segment 60 (also called compressor). The negative group velocity dispersion segment 60 is used to compensate the phase contributions of linear and nonlinear effects that have occurred during propagation through the connecting segment 40 and the optical amplifier 50 including the phase of output pulses 30 of the oscillator 20. The sign of the chirp between the oscillator 20 and the output of the optical amplifier 50 only changes once through the optical path. In some aspects of the invention, the laser system 10 does not include the negative dispersion segment 60. In another aspect, the negative group velocity dispersion segment 60 could be replaced or complemented by an optical filter to reduce the width of the output spectrum and thus decrease the amount of amplitude noise in the output spectrum by removing light from the edges of the spectrum.

In a first aspect of the invention, the stretched pulse oscillator 20 emits the negatively chirped optical pulses as the plurality of optical pulses 30. In this first aspect, the connecting segment 40 does not change the sign of the chirp of the oscillator 20 unlike the connecting segments 40 known in the art. The input 41 of the connecting segment 40 is connected to the output 22 of the stretched pulse oscillator 20 by a splice of optical fibers or a free space coupling. The output of the connecting segment 42 is connected to the amplifier 50.

At the input 41 of the connecting segment 40, the optical pulses 30 have a larger negative chirp compared to the optical pulses $30^I$ at the output 42 of the connecting segment 40. In other words, the negative chirp of the optical pulses $30^I$ and therefore the pulse duration of the optical pulses $30^I$ at the output 42 is reduced during propagating in a positive group velocity dispersion fiber which forms the connecting segment 40. Depending on the optical power of the optical pulses 30, nonlinear effects can occur in the connecting segment 40, which lead to a reduced spectral bandwidth of the optical pulses $30^I$ at the output 42 of the connecting segment 40.

Figure 2:
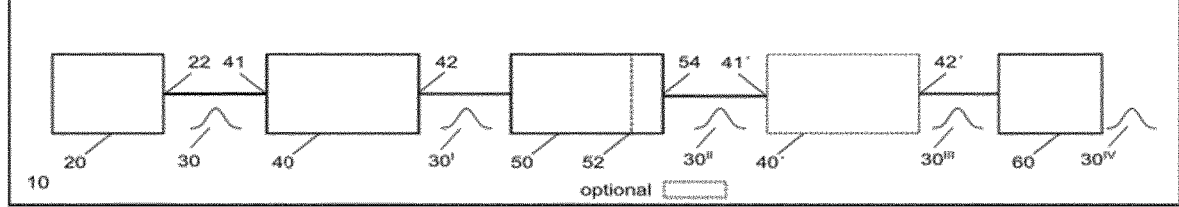
FIG. 2 shows a schematic diagram a further aspect of the invention including a second segment with positive group velocity dispersion after the amplifier.

It will be appreciated that it may be necessary to implement a short connecting segment 40' with positive group velocity dispersion after the amplifier 50, shown in FIG. 2. For example, there is a need to remove the pump light (from the optical pump) from the amplifier 50 and this is done by using a cladding light stripper to remove residual pump light from the amplifier 50. In this case the positive chirp of the optical pulse $30^{II}$ slightly increases at the output of the short connecting segment 40'.

Figure 3:
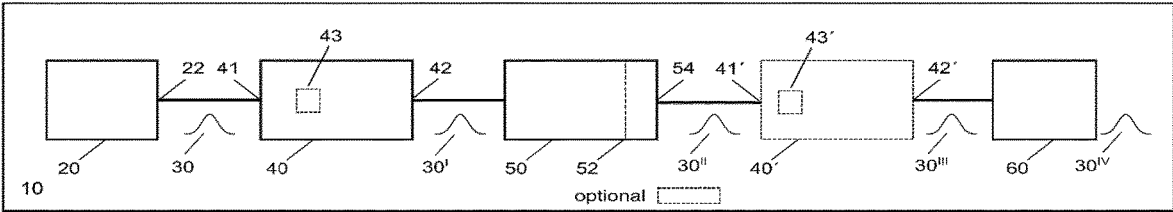
FIG. 3 shows a third aspect of the invention containing at least an optical isolator.
Figure 4:
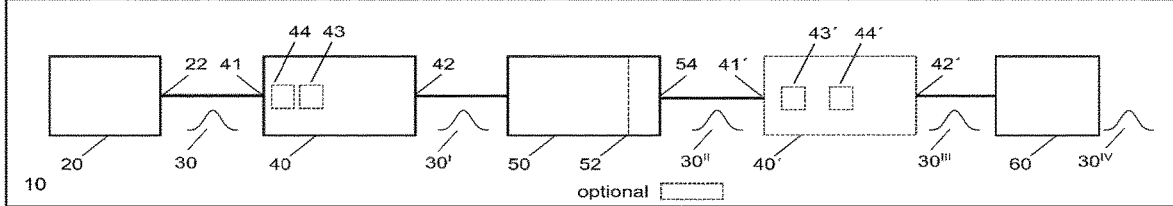
FIG. 4 shows a fourth aspect of the invention including at least an optical isolator and an attenuator.

At least one optical isolator 43 or 43' can be implemented in the connecting segment(s) 40 or 40' after the stretched pulse oscillator 20 and is shown schematically in FIG. 3. The position of the optical isolator 43 or 43' could be at the input 41 or 41' of the connecting segment 40 (40'), within the connecting segment 40 (40'), or at the output 42 (42') of the connecting segment 40 (40'). In this case the optical pulse $30^{III}$ will have a slightly changed chirp due to the presence of the optical isolator $43^I$ in the optical path.

Figure 14:
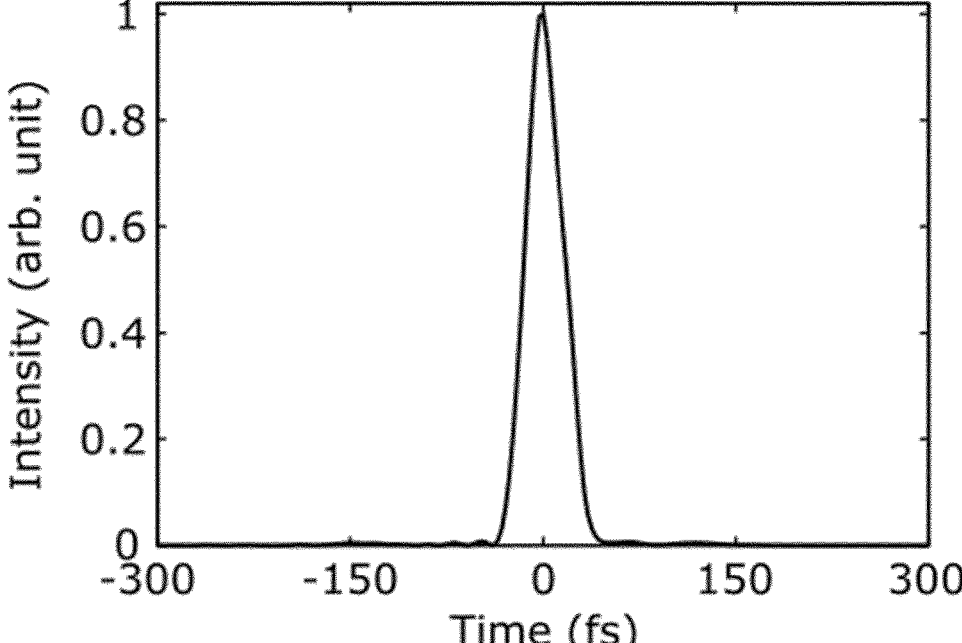
FIG. 14 shows a time compressed optical pulse after the compressor of the system having a pulse duration below 50 fs.
Figure 15:
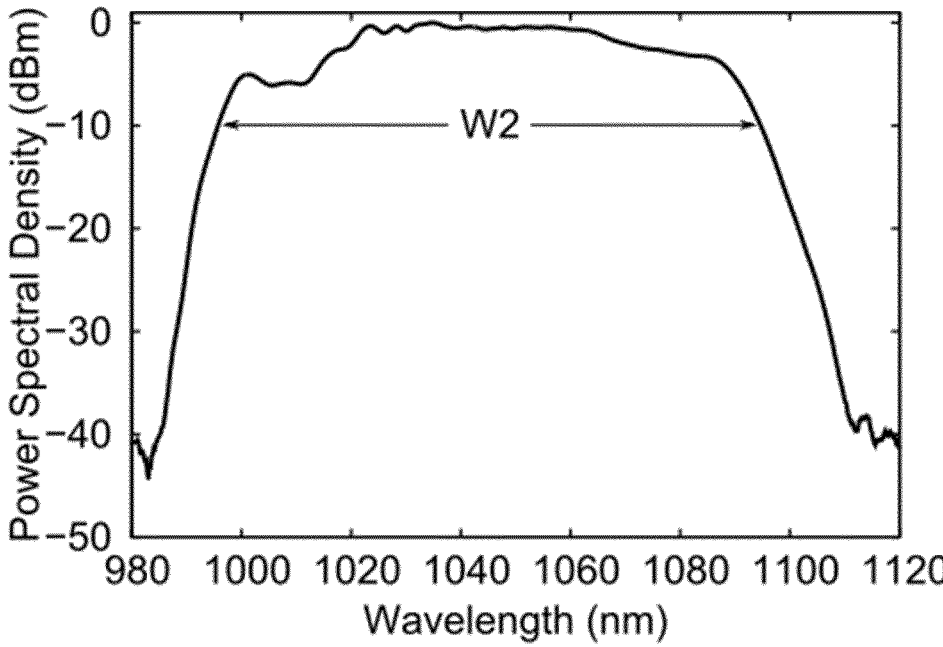
FIG. 15 shows the corresponding optical spectrum of the optical pulses at the output of the laser system having a spectral bandwidth W2.
Figure 16:
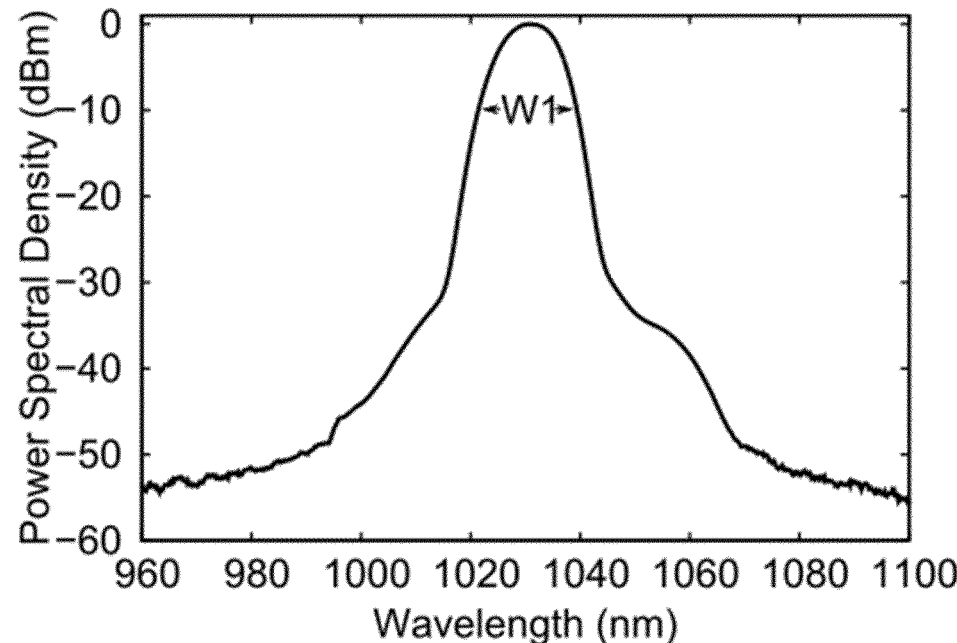
FIG. 16 shows a typical optical spectrum of the optical pulses at the output of an oscillator having a spectral bandwidth W1.
Figure 17:
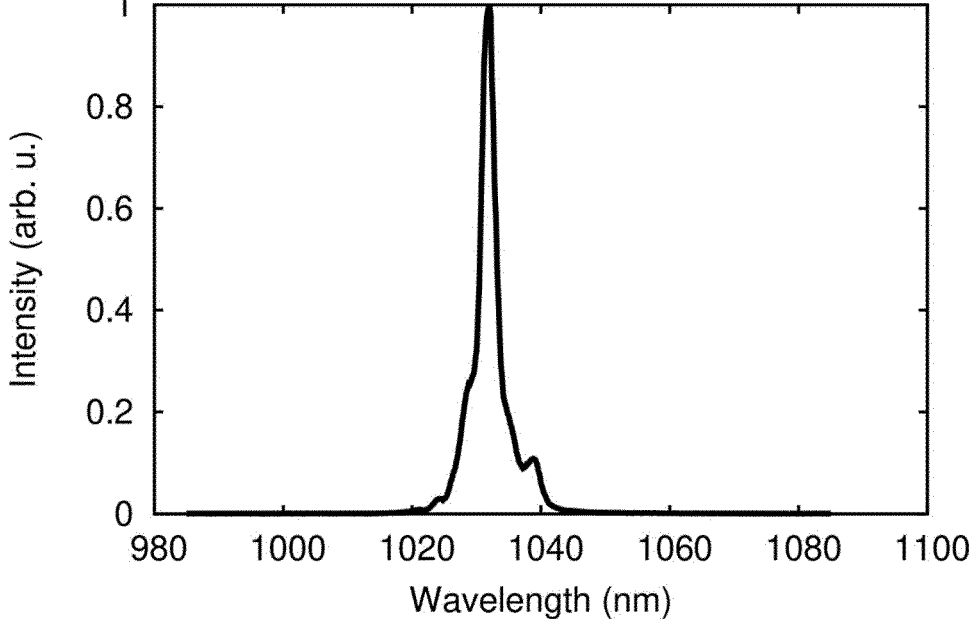
FIG. 17 shows the corresponding optical spectrum of the optical pulses at the output of the laser system having a spectral bandwidth W3.

After the (first) connecting segment 40, the negative chirped optical pulses $30^I$ propagate into the optical amplifier 50 which is used to increase the power level of the optical pulses $30^I$. Due to the nonlinear effects of the afore-mentioned SPM inside the optical amplifier 50 the chirp of the optical pulses $30^I$ is substantially reduced to zero at a "chirp-free" point 52 within the optical amplifier 50, as shown in FIGS. 1-6, as the optical amplifier 50 has a positive group velocity dispersion. At the output 54 of the optical amplifier 50, the optical pulses $30^{II}$ are positively chirped and the chirp can be compensated by a negative group velocity dispersion segment 60 connected to the output 54 of the optical amplifier 50 to a near Fourier limited pulse duration $30^{IV}$. In FIG. 14 an example of a measured FROG trace of the compressed optical light pulse is displayed. The corresponding optical spectrum is show in FIG. 15. The negative group velocity dispersion segment 60 can be, but are not limited to, a grating compressor, a prism compressor, a GRISM compressor, chirped mirrors, or a hollow core fiber segment. For an ideal compression, a pulse shaper can also be integrated.

The dispersion of the negative group velocity dispersion segment 60 is estimated to be smaller than three times the sum of the group velocity dispersion of the connecting segment 40 and the amplifier 50, i.e. $(3*(|b_{40}+b_{50}|)>|b_{60}|)$ in which $b_{40}$ represents the group velocity dispersion of the connecting segment, $b_{50}$ represents the group velocity dispersion of the optical amplifier 50 and $b_{60}$ represents the group velocity dispersion of the negative group velocity dispersion segment 60. The value of the dispersion is not, however limiting of the invention.

In a further aspect of the laser pulse system 10, the power level inside the connecting segment 40 or 40' can be adjusted by at least an attenuator 44 (or 44') (shown in FIGS. 4-6) or a preamplifier 45 (shown in FIGS. 5 and 6), or a combination of both (as in FIGS. 5 and 6) for controlling the non-linear effects in the connecting segment 40 and the amplifier 50. The position of the attenuators 44 or 44' or the preamplifier 45 could be at the input 41/41' of the connecting segments 40 and 40', within the connecting segments 40 and 40', or at the output 42 or 42' of the connecting segments 40 or 40'. A higher power output can be achieved by increasing the diameter of the mode field in the optical fiber.

Figure 5:
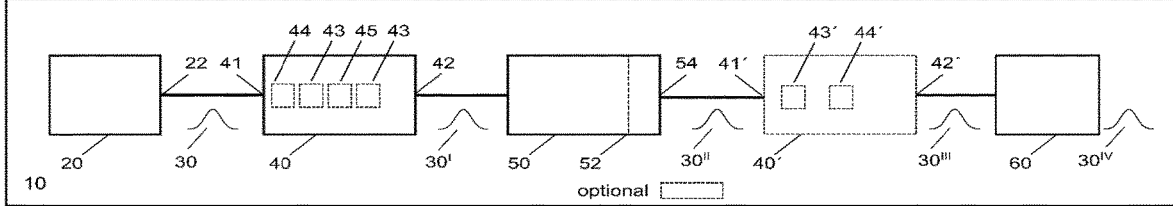
FIG. 5 shows a fifth aspect of the invention including at least an optical isolator, an attenuator or an optical pream-plifier.
Figure 6:
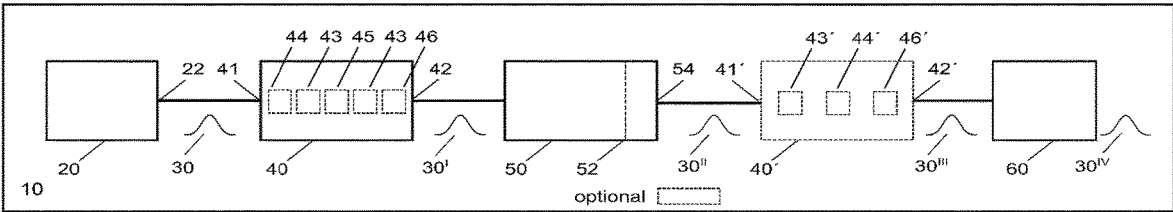
FIG. 6 shows a sixth aspect of the invention including at least an optical isolator, an attenuator or an optical pream-plifier and a pulse picker.

The preamplifier could be one of a fiber-based preamplifier, a (fiber-coupled) semiconductor optical amplifier or a solid-state amplifier An optical isolator 43 can be used after the preamplifier 45 (as shown in FIGS. 5 and 6).

By combining a negative chirp of the optical pulses 30 and a positive group velocity dispersion in the connecting segment 40, the spectral bandwidth of the optical pulses $30^I$ at the output 42 will be reduced, thus creating a "nonlinear band pass filter" at a "chirp free point" 52 inside the optical amplifier 50, as shown in FIGS. 1-6. It would be possible to couple the optical pulse 30 out near to this point to provide an optical pulse 30 with a very narrow spectrum W3 by reducing the length of the amplifier 50.

A sixth aspect of the laser system 10 is shown in FIG. 6 and enables the integration of an optical pulse picker 46 to reduce the repetition rate of the stretched pulse oscillator 20 to increase the pulse energy after the optical amplifier 50. A second pulse picker 46' can be added in front of the compressor 60 within the connecting segment 40' to generate a pulse on demand functionality.

Figure 7:
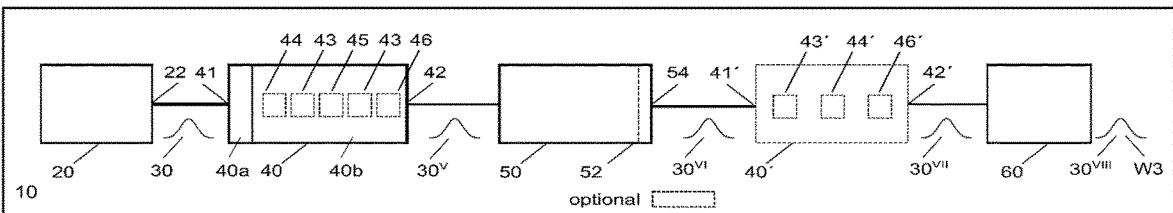
FIG. 7 shows schematic diagram of the other aspect of the laser with an additional negative dispersion segment within the connecting segment.

A seventh aspect of the laser system 10 is shown in FIG. 7. An additional part of negative dispersion 40a is added to the positive dispersion 40b of the connecting segment 40 while changing only the amount of the chirp without changing the sign. This allows for an adaption of the position of the chirp free point 52 inside the amplifier 50. The optical pulse 30$^V$ at the output 42 of the connecting segment 40 will have a larger negative chirp compared to the optical pulse 30 coming from the oscillator 20 and arriving at the input 41 of the connecting segment. The position of the chirp free point 52 will shift towards the end of the amplifier 50. This mechanism can be used to adapt the chirp free point 52. The chirp of the optical pulse 30$^{VI}$ will be positive after the amplifier 50 and slightly increased by propagating through the optional parts 43', 44' and 46' and their dispersion leading to an optical pulse 30$^{VII}$.

If the chirp free point 52 is shifted to the end of the amplifier 50, an optical pulse 30 V$^{III}$ with a narrow spectrum W3 can be generated.

The stretched pulse oscillator 20, the connecting segment 40 and the optical amplifier 50 are connected with fiber splices. Nevertheless, transitions between any of the stretched pulse oscillator 20, the connecting segment(s) 40 and 40' and the optical amplifier 50 can also be implemented by free space coupling. Therefore, free space isolators 43 and 43' pulse pickers 46 and 46', attenuators 44 and 44' or preamplifiers 45 can also be used.

The ultrabroadband generation of the optical pulses is based on the interaction of linear effects and nonlinear effects within the amplifier and so the maximum energy, or the spectral bandwidth, can be controlled by choosing different mode field diameters during the propagation.

The optical amplifier 50 can be made in a non-limiting example of a fiber amplifier doped with Ytterbium. It is thought that the optical amplifier 50 can be adapted to all lasing materials, such as but not limited to, Nd, Tm, Er, Er—Yb.

The principle is not limited to fiber laser technology and in different aspects, the principle can also be adapted to solid state amplifiers, including for example thin disk amplifiers, slab amplifiers, crystal-based amplifiers, rod amplifiers or other types. For a more general approach the negative chirped optical pulses 30 from the stretched pulse oscillator 20 or a soliton oscillator have to propagate through a medium of positive group velocity dispersion segment, which is not limited to optical fibers, but can also be waveguides (included those implemented as micro-optics on a wafer) or materials with positive group velocity dispersion.

Figure 8:
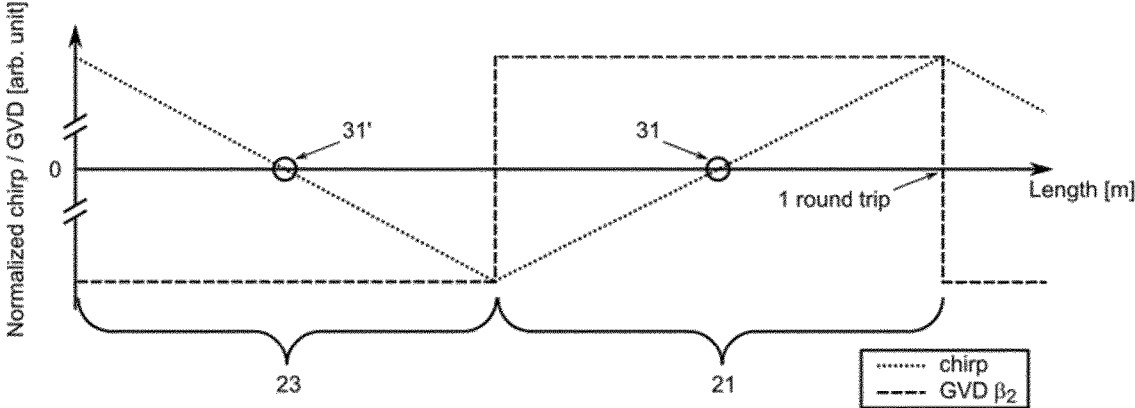
FIG. 8 shows schematic diagram of the pulse evolution inside a Stretched Pulse Laser system.

The use of a positive group velocity dispersion for the connecting segment 40 requires the production of the negatively chirped optical pulses 30 in the stretched pulse oscillator 20. This is illustrated in FIG. 8 and can be achieved by using two different dispersion segments inside an oscillator cavity. The oscillator cavity comprises a positive group velocity dispersion segment 21 and a negative group velocity dispersion segment 23. The overall net group velocity dispersion (GVD) has to be less than 0.1 ps² ($\beta_{2net}$<0.1 ps²). In this case the optical pulses 30 undergo a change of the chirp sign within the two dispersion segments, i.e., a negative dispersion segment 21 and a positive dispersion segment 23. FIG. 7 shows the evolution of the chirp (normalized y-axis in arbitrary units (arb.unit)) of an optical light pulse inside a stretched pulse cavity during propagation (x-axis in meter). Furthermore, the corresponding group velocity dispersion segments (normalized y-axis in arbitrary unit (arb. unit)) are displayed. During the propagation, the pulse has to be free of chirp twice per round trip, as can be seen in FIG. 7. According to FIG. 7 the chirp free points are located at the ends of the linear cavity. Depending in the overall net dispersion, the position of the chirp free pulses can be changed.

Starting from a chirp free point 31 within the positive group velocity dispersion segment 21 a positive chirp is generated by propagating through the positive dispersion segment 21 forming one part of the stretched pulse oscillator 20. This positive chirp will be reduced within the negative group velocity dispersion segment 23 forming a second part of the oscillator cavity 20, leading to a chirp free optical pulse at a position 31' within the segment 23, and changing the sign of the chirp afterwards. This negative chirp increases up to the end of the negative group velocity dispersion segment 23. Finally, the negative chirp will be reduced by entering the positive group velocity dispersion segment 21 and after one roundtrip will reach the chirp free starting point 31 again. For the apparatus of this document the optical output pulses of the oscillator 30 have to have a negative chirp at the output coupler 27 of the oscillator 20.

Figure 9:
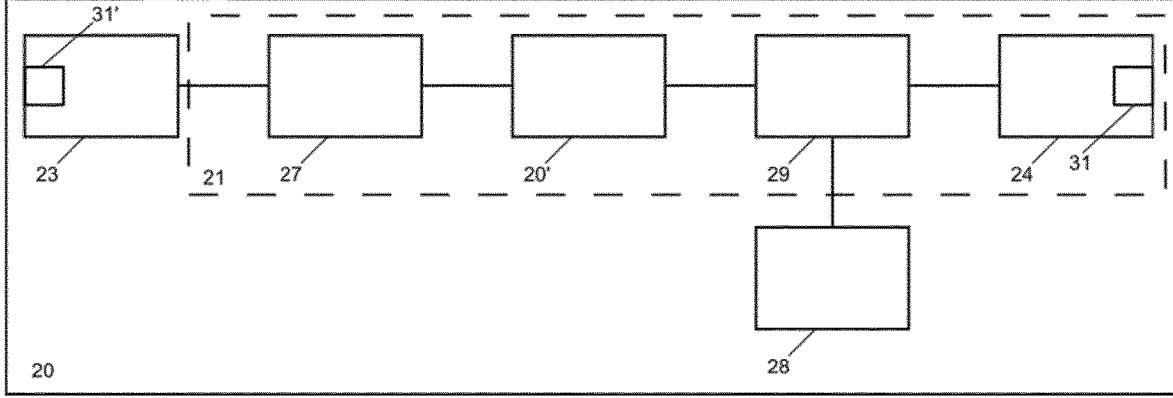
FIG. 9 shows a schematic embodiment of the Stretched Pulse oscillator configured in a linear cavity.

One example of the stretched pulse oscillator 20 is shown in FIG. 9. The stretched pulse oscillator 20 comprises an optical pump 28 for generating the pump light for the laser active fiber segment 20'. The optical pump 28 is coupled to the cavity by using a pump coupler 29. The negative dispersion segment 23 is implemented by a grating compressor at one end of a linear cavity.

The optical fiber part forms the positive dispersion segment 21. The stretched pulse oscillator 20 is mode-locked by using a saturable absorber mirror 24 at the other end of the linear optical cavity. An output coupler 27 is placed behind the negative dispersion segment 23 (in propagation direction).

Figure 10:
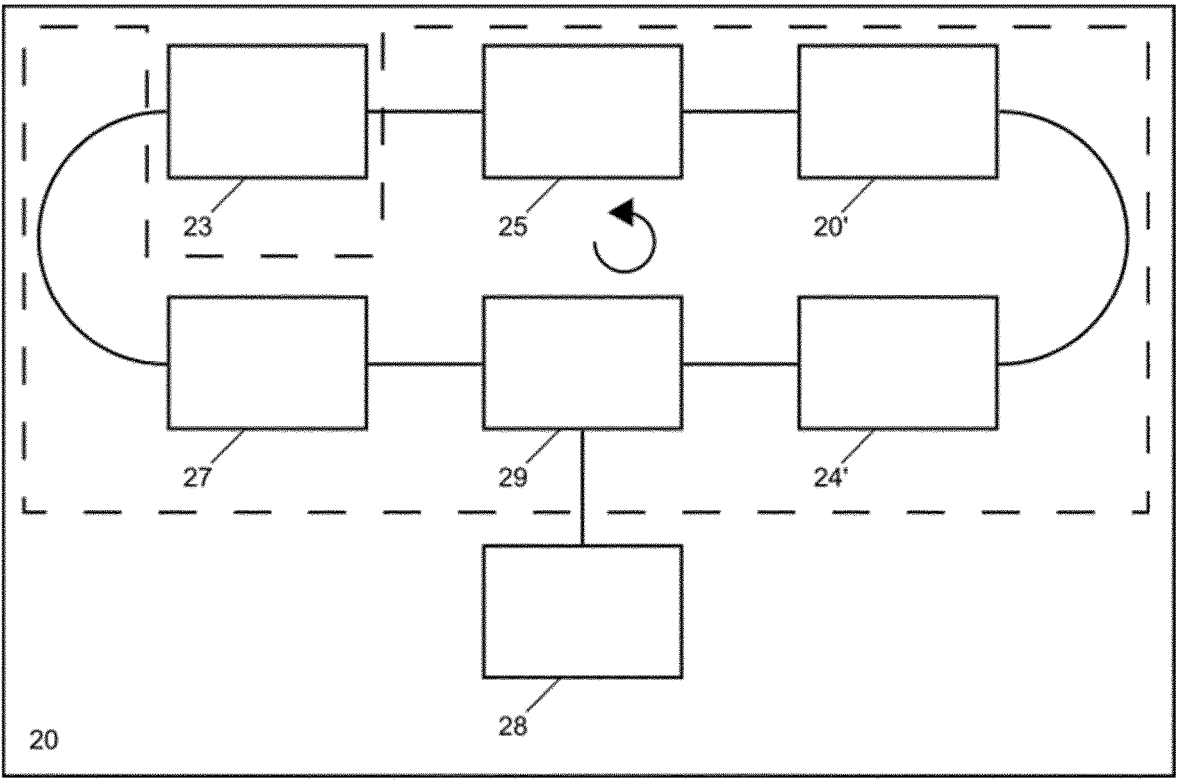
FIG. 10 shows a schematic embodiment of the Stretched Pulse oscillator configured in a ring cavity.
Figures 11, 12:
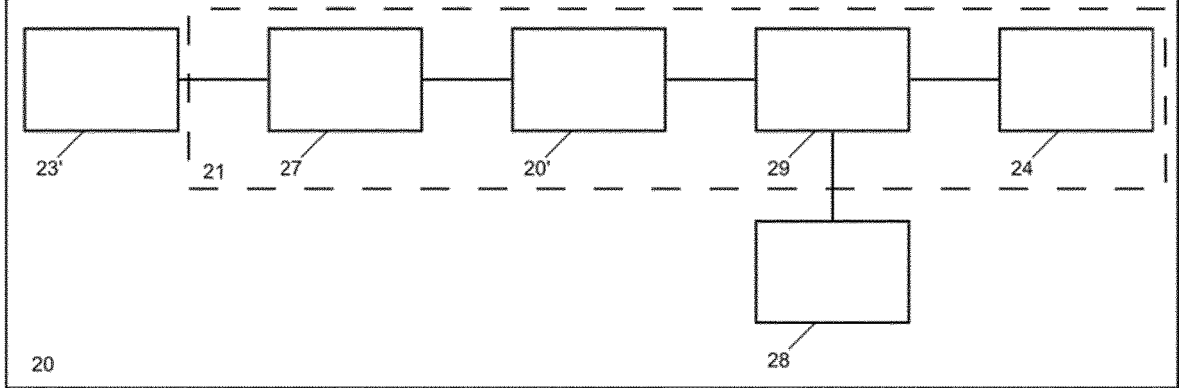
FIG. 11 shows a schematic embodiment of the Stretched Pulse oscillator configured in a sigma arm cavity.
FIG. 12 shows a schematic embodiment of the Stretched Pulse oscillator configured in a linear cavity with a dispersion compensation by using a chirped fiber Bragg grating.

Other different aspects of the laser optical cavity of the stretched pulse oscillator 20 are shown in FIGS. 10 and 11. The optical cavity can also be implemented as a ring cavity when using an optical isolator 25 and a saturable absorber 24' or as a sigma cavity when using a circulator 26 to implement a saturable absorber mirror 24 in the optical cavity.

Figure 13:
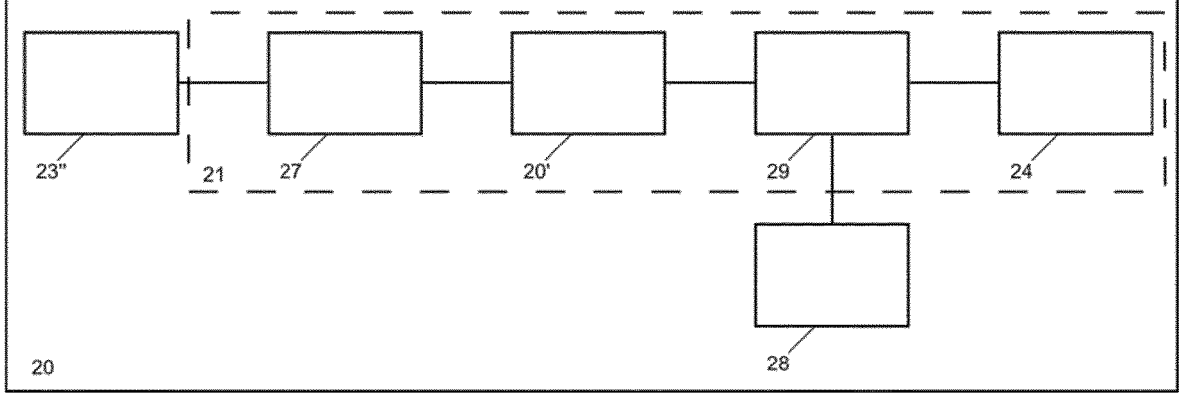
FIG. 13 shows a schematic embodiment of the Stretched Pulse oscillator configured in a linear cavity with a fiber-based dispersion compensation by using photonic crystal fibers or hollow core fibers.

To further reduce free space parts inside the linear cavity oscillator the negative dispersion segment 23 can be implemented using a chirped fiber Bragg grating 23' (FIG. 12) or a negative dispersion photonic crystal fiber combined with a fiber-based mirror (23") can be used (FIG. 13) instead of a grating compressor.

In one aspect all of the optical fibers used are polarization maintaining fibers to achieve an environmental stable system. In general, however, the laser pulse system of this disclosure is not limited to polarization maintaining fibers. Non-polarization maintaining fibers could also be used. Furthermore, the laser pulse system 10 is not limited to single clad fibers. In addition, other types of fibers as double clad fibers can be used. Depending on the type of fibers single or multimode laser diodes can be used for pumping. Mode-locking can also be achieved by using any kind of saturable absorber (24') or virtual saturable absorber as for example nonlinear pulse evolution.

As already noted above, the laser pulse system 10 of this document can be implemented in a bulk solid, as long as there is a provision for management of the dispersion of the optical pulse. This will require at least one positive dispersion element and one negative dispersion segment.

REFERENCE NUMERALS

10 Laser system
20 Stretched pulse oscillator

20′ Laser active fiber segment
21 Positive dispersion segment
22 Output
23 Negative dispersion segment
24 Absorber mirror
25 Optical isolator
26 Circulator
27 Output coupler
28 Optical pump
29 Pump coupler
30 Optical pulse
31 Chirp-free point
40 Connecting segment
40a negative dispersion ($\beta 2 < 0$) segment within the connecting segment
40b positive dispersion ($\beta 2 > 0$) segment within the connecting segment
41 Input
42 Output
43 Isolator
44 Attenuator
45 Preamplifier
46 Optical pulse picker
50 Optical amplifier
52 Chirp-free point
54 Output
60 Negative dispersion segment

The invention claimed is:

1. A laser system comprising:
an oscillator producing a plurality of negatively chirped optical pulses having a first spectral width W1;
an amplifier for receiving the plurality of optical pulses and amplifying the plurality of optical pulses to produce at an output of the amplifier an optical light pulse having a second spectral width W2; and
a positive group velocity dispersion connecting segment connected directly between the oscillator and an input of the amplifier, wherein the connecting segment is adapted to maintain the sign of the chirp of the plurality of optical pulses; and wherein the sign of the chirp is changed between the oscillator and the output of the amplifier.

2. The laser system of claim 1, wherein the second spectra width W2 at the output of the amplifier is greater than the first spectral width WI of the oscillator.

3. The laser system of claim 1, wherein the connecting segment has a positive group velocity dispersion ($\beta_2 > 0$) without changing the sign of the chirp.

4. The laser system of claim 1, wherein the connecting segment is adapted to change the amount of the chirp.

5. A laser system comprising:
an oscillator producing a plurality of negatively chirped optical pulses having a first spectral width W1;
an amplifier for receiving the plurality of optical pulses and amplifying the plurality of optical pulses to produce at an output of the amplifier an optical light pulse having a second spectral width W2;
a positive group velocity dispersion connecting segment connected directly between the oscillator and an input of the amplifier, wherein the connecting segment is adapted to maintain the sign of the chirp of the plurality of optical pulses; and wherein the sign of the chirp is changed between the oscillator and the output of the amplifier; and
a second segment of positive group velocity dispersion segment ($\beta_2$) connected to an output of the amplifier.

6. The laser system of claim 1, further comprising a negative group velocity dispersion segment ($\beta_2$) connected to an output of the amplifier and being adapted to compensate the phase contributions of linear and nonlinear effects that have occurred during propagation through the connecting segment and the optical amplifier including the phase of the optical pulse.

7. The laser system of claim 1, wherein the amplifier is one of a fiber amplifier, a rod-type amplifier, a slab amplifier, thin disk amplifier or a solid-state amplifier.

8. The laser system of claim 1, wherein the connecting segment is a combination of positive group velocity dispersion ($\beta_2$) and negative group velocity dispersion segments ($\beta_2$) without changing the sign of the chirp.

9. The laser system of claim 1, further comprising at least one optical isolator located after the oscillator.

10. The laser system of claim 9, wherein the optical isolator is one of a free space or fiber coupled.

11. The laser system of claim 1, further including at least one of a pre-amplifier or an attenuator within the connecting segment.

12. The laser system of claim 11, wherein the preamplifier is one of a fiber-based amplifier, a semiconductor optical amplifier or a solid-state amplifier.

13. The laser system of claim 1, further including at least an optical pulse picker to adjust the temporal separation between the optical pulses.

14. The laser system of claim 1, wherein the oscillator comprises at least a segment of positive group velocity dispersion ($\beta_2$) and a segment of negative group velocity dispersion ($\beta_2$).

15. The laser system of claim 1, wherein the laser active medium of at least one of the oscillator or the amplifier (50) is selected from the group of dopants comprising Yb, Nd, Tm, or Er.

16. The laser system (10) of claim 1, wherein the oscillator (20) comprises a linear cavity with a saturable absorber at one end and a grating compressor at the other end.

17. The laser system of claim 1, wherein the amplifier is pumped by at least one of a single mode diode laser or multi-mode laser.

18. The laser system of claim 1, wherein the oscillator and amplifier are one of a single clad fiber or a double clad fiber or a combination of these.

19. The laser system of claim 1, wherein the amplifier comprises a chirp-free point at which, in use, the chirp of the optical pulses is substantially reduced to zero, wherein at the output of the optical amplifier, the optical pulses are positively chirped.

20. A laser system comprising:
an oscillator producing a plurality of negatively chirped optical pulses having a first spectral width W1;
an amplifier for receiving the plurality of optical pulses and amplifying the plurality of optical pulses to produce at an output of the amplifier an optical light pulse having a second spectral width W2; and
a positive group velocity dispersion connecting segment connected directly between the oscillator and an input of the amplifier, wherein the connecting segment is adapted to maintain the sign of the chirp of the plurality of optical pulses; and wherein the sign of the chirp is changed between the oscillator and the output of the amplifier;
wherein at an output of the laser system a third spectral width is generated, in use, by shifting the chirp-free point to the end of the amplifier.

* * * * *